(12) United States Patent
Quinlan et al.

(10) Patent No.: US 7,548,544 B2
(45) Date of Patent: Jun. 16, 2009

(54) METHOD OF DETERMINING NETWORK ADDRESSES OF SENDERS OF ELECTRONIC MAIL MESSAGES

(75) Inventors: Daniel Quinlan, San Bruno, CA (US); Jeffrey Wescott, San Bruno, CA (US)

(73) Assignee: IronPort Systems, Inc., San Bruno, CA (US)

( * ) Notice: Subject to any disclaimer, the term of this patent is extended or adjusted under 35 U.S.C. 154(b) by 0 days.

(21) Appl. No.: 11/429,474

(22) Filed: May 5, 2006

(65) Prior Publication Data

US 2007/0070921 A1   Mar. 29, 2007

Related U.S. Application Data

(60) Provisional application No. 60/678,391, filed on May 5, 2005.

(51) Int. Cl.
*H04L 12/28* (2006.01)
(52) U.S. Cl. ................. 370/392; 370/401; 709/225; 726/24
(58) Field of Classification Search ................. 370/252, 370/389, 392, 401; 709/204, 205, 206, 223, 709/225; 707/3, 6; 713/188; 726/2, 3, 11, 726/21, 22, 23, 24
See application file for complete search history.

(56) References Cited

U.S. PATENT DOCUMENTS

| | | | |
|---|---|---|---|
| 5,933,416 A * | 8/1999 | Schenkel et al. ............. | 370/254 |
| 5,966,685 A | 10/1999 | Flanagan et al. | |
| 6,006,329 A * | 12/1999 | Chi ............................. | 726/24 |
| 6,052,709 A | 4/2000 | Paul | |
| 6,072,942 A | 6/2000 | Stockwell et al. | |
| 6,073,165 A | 6/2000 | Narasimhan et al. | |
| 6,415,313 B1 | 7/2002 | Yamada et al. | |

(Continued)

FOREIGN PATENT DOCUMENTS

EP   1509014 A2 *  2/2005

OTHER PUBLICATIONS

Garreston, "IronPort looks to be E-mail's Guardian", Sep. 27, 2004, Network World, p. 35-36.*

(Continued)

*Primary Examiner*—Hassan Kizou
*Assistant Examiner*—Brian T O'Connor
(74) *Attorney, Agent, or Firm*—Hickman Palermo Truong & Becker LLP

(57) ABSTRACT

In one embodiment, a method comprises computer-implemented steps of receiving a plurality of electronic mail messages containing sender address information that is non-trusted. For each electronic mail message, information about the message is stored, and one or more receiving node identifiers in association with respective connected node identifiers is created, wherein the receiving node identifier identifies receiving mail server that received the particular message and the connected node identifier identifies a connected mail server that directly connected to the receiving node identifier to send the particular message directly to the receiving mail server. For each electronic mail message a receiving node identifier that has a largest number of connected node identifiers associated therewith is selected, and a connected node identifier that is associated with the one particular receiving node identifier that sent the particular message to the associated receiving node is selected and stored.

20 Claims, 4 Drawing Sheets

U.S. PATENT DOCUMENTS

| | | | |
|---|---|---|---|
| 6,453,327 | B1 | 9/2002 | Nielsen |
| 6,507,866 | B1 | 1/2003 | Barchi |
| 6,654,787 | B1 | 11/2003 | Aronson et al. |
| 6,941,348 | B2 | 9/2005 | Petry et al. |
| 7,181,498 | B2 * | 2/2007 | Zhu et al. ............... 709/206 |
| 7,184,971 | B1 | 2/2007 | Ferber |
| 7,206,814 | B2 | 4/2007 | Kirsch |
| 7,272,853 | B2 * | 9/2007 | Goodman et al. ........ 726/13 |
| 7,366,761 | B2 | 4/2008 | Murray et al. |
| 7,409,708 | B2 * | 8/2008 | Goodman et al. ........ 726/13 |
| 7,475,118 | B2 * | 1/2009 | Leiba et al. ............. 709/206 |
| 2001/0039593 | A1 | 11/2001 | Hariu |
| 2002/0120600 | A1 | 8/2002 | Schiavone et al. |
| 2002/0184533 | A1 | 12/2002 | Fox |
| 2003/0050988 | A1 | 3/2003 | Kucherawy |
| 2003/0191969 | A1 | 10/2003 | Katsikas |
| 2003/0225850 | A1 | 12/2003 | Teague |
| 2004/0003255 | A1 | 1/2004 | Apvrille et al. |
| 2004/0019651 | A1 | 1/2004 | Andaker |
| 2004/0024632 | A1 | 2/2004 | Perry |
| 2004/0068542 | A1 | 4/2004 | Lalonde et al. |
| 2004/0083408 | A1 * | 4/2004 | Spiegel et al. ............ 714/43 |
| 2004/0111381 | A1 | 6/2004 | Messer et al. |
| 2004/0177120 | A1 | 9/2004 | Kirsch |
| 2004/0186891 | A1 | 9/2004 | Panec et al. |
| 2005/0091319 | A1 | 4/2005 | Kirsch |
| 2005/0203994 | A1 | 9/2005 | Palmer et al. |
| 2005/0246440 | A1 * | 11/2005 | Yu ........................ 709/225 |
| 2005/0283837 | A1 * | 12/2005 | Olivier et al. ............ 726/24 |
| 2008/0104186 | A1 | 5/2008 | Wieneke et al. |
| 2008/0104187 | A1 | 5/2008 | Wilson et al. |
| 2008/0256072 | A1 | 10/2008 | Logan et al. |
| 2008/0270540 | A1 | 10/2008 | Larsen |

OTHER PUBLICATIONS

International Searching Authority, "Notification of Transmittal of the International Search Report and the Written Opinion of the International Searching Authority, or the Declaration," PCT/US05/19143, Dated Apr. 7, 2006, 8 pages.

Current Claims, PCT/US05/19143, 24 pages.

Kephart, Jeffrey O., et al., "Biologically Inspired Defenses Against Computer Viruses", International Joint Conference on Artificial Intelligence, 1995, 12 pages.

Wong, "Preventing Spams and Relays", Linux, 1998, Dec. 1998, 7 pages.

Spam Assassin, retrieved from http://web.archive.org, retrieved Dec. 2008, 60 pages.

Ironport, "Messaging Gateway Appliances", http://web.archive.org, Dec. 2008, 14 pages.

Microsoft, "Microsoft Computer Dictionary", Fifth Edition, May 2002, 7 pages.

Smith, Roderick, W., "Advanced Linux Networking", Addison Wesley Professional, Jun. 2002, 62 pages.

U.S. Appl. No. 11/418,823, filed May 5, 2006, Final OA, mailed Feb. 18, 2009.

U.S. Appl. No. 11/006,209, filed Dec. 6, 2004, Office Action, mailed Feb. 17, 2009.

U.S. Appl. No. 11/139,114, filed May 27, 2005, Office Action, mailed Feb. 24, 2009.

U.S. Appl. No. 11/636,150, filed Dec. 7, 2006, Office Action, mailed Jan. 9, 2009.

U.S. Appl. No. 10/857,641, filed May 28, 2004, Office Action, mailed Apr. 2, 2009.

U.S. Appl. No. 11/139,374, filed May 26, 2005, Final Office Action, mailed Apr. 3, 2009.

* cited by examiner

METHOD OF DETERMINING NETWORK ADDRESSES OF SENDERS OF ELECTRONIC MAIL MESSAGES

CROSS-REFERENCE TO RELATED APPLICATIONS; PRIORITY CLAIM

This application claims benefit of Provisional Appln. 60/678,391, filed May 5, 2005, the entire contents of which is hereby incorporated by reference as if fully set forth herein, under 35 U.S.C. §119(e).

FIELD OF THE INVENTION

The present invention generally relates to network data communications. The invention relates more specifically to processing electronic mail messages that are unwanted or associated with viruses or other threats.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Senders of electronic mail messages that are unwanted or unsolicited ("spam"), or that contain viruses or other threats such as "phishing" attacks often use tactics to conceal the identity of the senders or the computers that the senders are using. In one approach, senders forward a message multiple times among multiple computers that the senders are using and configure one of the computers at the end of the forwarding chain to automatically send the message to recipients. With this tactic, in systems that use internet protocol (IP) and simple mail transfer protocol (SMTP), the forwarding operations cause appending to the message multiple headers containing multiple different source IP addresses.

Consequently, when the message is received, threat detection systems and other analytical tools often cannot determine the IP address of the actual original sender of the message. In a threat detection system that is based on information indicating the sending reputation of the sender, determining the actual original sender is important, because a reputation value associated with the sender typically determines what action to take for the message.

Based on the foregoing, there is a clear need in the data processing field for a method that permits determining the network address of the sender of e-mail messages.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
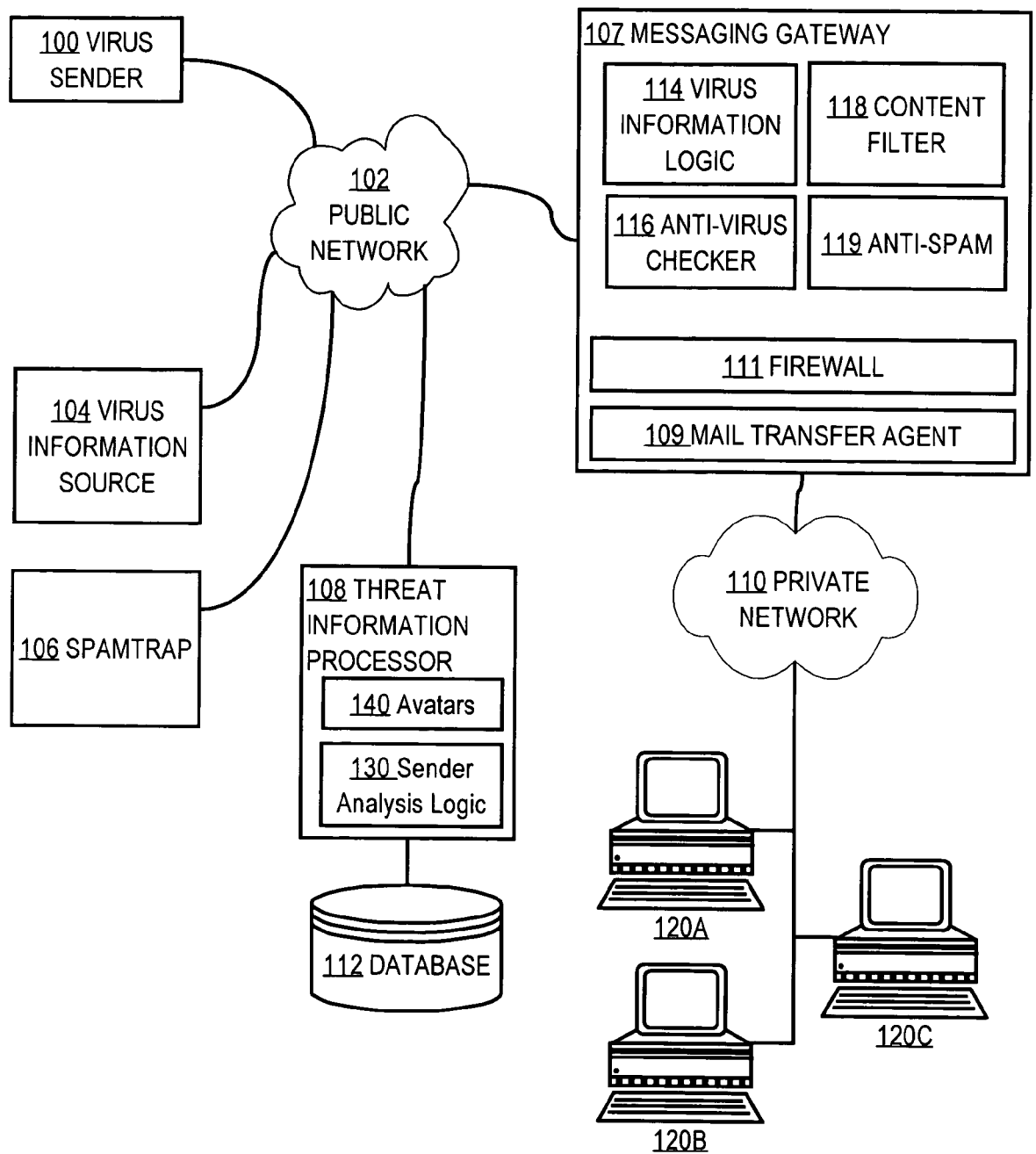
FIG. 1 is a block diagram that illustrates an example network arrangement that may be used to implement an embodiment.

A method and apparatus for determining network addresses of senders of electronic mail messages are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method, comprising the computer-implemented steps of receiving a plurality of electronic mail messages containing sender address information that is non-trusted; for each particular one of the electronic mail messages: storing information about the particular message in a database record; creating and storing one or more receiving node identifiers in association with respective connected node identifiers, wherein the receiving node identifiers identify mail servers that received the particular message and the connected node identifiers identify mail servers that connected to the receiving node identifiers to send the particular message; selecting one particular receiving node identifier that has a largest number of connected node identifiers associated therewith; selecting one particular connected node identifier that is associated with the one particular receiving node identifier that sent the particular message to the associated receiving node; storing, in the database record, in a sender field that identifies a sender of the particular message, the one particular connected node identifier.

In one feature, the receiving node identifiers and connected node identifiers are IP addresses. In another feature, the receiving node identifiers and connected node identifiers are stored in a logical tree data structure that represents a network topology that includes the receiving nodes and the connected nodes. In a related feature, nodes in the tree represent network elements involved in sending, receiving or forwarding the electronic mail messages and branches in the tree represent mail transfer protocol connections that were established between the network elements.

In another feature the method further comprises retrieving the database record; determining whether a value of the sender field is found in a blacklist; creating and storing a poor reputation score value when the value of the sender field is found in the blacklist and creating and storing another reputation score value indicating a reputation other than a good reputation when the value of the sender field is not found in the blacklist.

In other aspects, the invention encompasses other computer apparatus and a computer-readable medium configured to carry out the foregoing steps.

2.0 Structural and Functional Overview

FIG. 1 is a block diagram that illustrates an example network arrangement that may be used to implement an embodiment. For purposes of illustrating a clear example, the description refers to computer viruses. However, other embodiments may work with messages that contain or relate to any form of message-borne threat, such as spam or unsolicited messages, messages containing "phishing" attacks or other deceptive or harmful content. Thus, the broad approaches herein are not limited to systems that work with viruses.

Referring now to FIG. 1, a virus sender 100, whose identity and location are typically unknown, sends a message infected with a virus, typically in an electronic message, or email, with a virus-bearing executable file attachment, to public network 102, such as the Internet. The message is either addressed to, or propagates by action of the virus to, a plurality of destinations such as virus information source 104 and spamtrap 106. A spamtrap is an email address or an email mailbox used exclusively to collect information about unsolicited email messages. For purposes of illustrating a simple example, FIG. 1 shows only two destinations in the form of virus information source 104 and spamtrap 106, but in a practical embodiment there may be any number of such sources of virus information.

The virus sender 100 may obtain network addresses of virus information source 104 and spamtrap 106 from public sources, or by sending the virus to a small number of known addresses and letting the virus propagate.

A threat information processor 108 is communicatively coupled to public network 102 and can receive information from the virus information source 104 and spamtrap 106. Threat information processor 108 implements certain functions described further herein including collecting virus information from virus information source 104 and spamtrap 106, generating virus outbreak information, and storing the virus outbreak information in a database 112.

A messaging gateway 107 is coupled, directly or indirectly through a firewall 111 or other network elements, from public network 102 to a private network 110 that includes a plurality of end stations 120A, 120B, 120C. Messaging gateway 107 may be integrated with a mail transfer agent 109 that processes email for private network 110, or the mail transfer agent may be deployed separately. For example, an IronPort Messaging Gateway Appliance (MGA), such as model C60, C30, C10, X1000, etc., commercially available from IronPort Systems, Inc., San Bruno, Calif., may implement mail transfer agent 109, firewall 111, and the functions described herein for messaging gateway 107.

In an embodiment, messaging gateway 107 includes virus information logic 114 for obtaining virus outbreak information from threat information processor 108 and processing messages destined for end stations 120A, 120B, 120C according to policies that are set at the messaging gateway. Such virus information logic may be integrated with a content filter function of messaging gateway 107.

Messaging gateway 107 may also include an anti-virus checker 116 such as ClamAV, a content filter 118, and anti-spam logic 119 such as a SpamAssassin module. The anti-virus checker 116 may comprise, for example, Sophos anti-virus software. The content filter 118 provides logic for restricting delivery or acceptance of messages that contain content in a message subject or message body that is unacceptable according to a policy associated with private network 10. The anti-spam logic 119 scans inbound messages to determine if they are unwanted according to a mail acceptance policy, such as whether the inbound messages are unsolicited commercial email, and the anti-spam logic 119 applies policies to restrict delivery, redirect, or refuse acceptance of any unwanted messages.

The private network 110 may be an enterprise network associated with a business enterprise or any other form of network for which enhanced security or protection is desired. Public network 102 and private network 10 may use open standard protocols such as TCP/IP for communication.

Virus information source 104 may comprise another instance of a messaging gateway 107 that is interposed between public network 102 and another private network (not shown for clarity) for purposes of protecting that other private network. In one embodiment, virus information source 104 is an IronPort MGA. Spamtrap 106 is associated with one or more email addresses or email mailboxes associated with one or more domains. Spamtrap 106 is established for the purpose of receiving unsolicited email messages, or "spam," for analysis or reporting, and is not typically used for conventional email communication. For example, a spamtrap can be an email address such as "dummyaccountforspam@mycompany.com," or the spamtrap can be a collection of email addresses that are grouped into a mail exchange (MX) domain name system (DNS) record for which received email information is provided. Mail transfer agent 109, or the mail transfer agent of another IronPort MGA, may host spamtrap 106.

In an embodiment, virus information source 104 generates and provides information to threat information processor 108 for use in managing computer virus outbreaks, and the threat information processor 108 can obtain information from spamtrap 106 for the same purpose. For example, virus information source 104 generates counts of received messages that have suspicious attachments, and provides the counts to threat information processor 108, or allows an external process to retrieve the counts and store them in a specialized database. Messaging gateway 107 also may serve as a virus information source by detecting messages that have indications that are associated with viruses or that are otherwise suspicious, creating a count of suspicious messages received in a particular time period, and periodically providing the count to threat information processor 108.

As a specific example, the functions described herein may be implemented as part of a comprehensive message data collection and reporting facility, such as the SenderBase service from IronPort Systems, Inc. In this embodiment, threat information processor 108 can retrieve or receive information from virus information source 104 and spamtrap 106, generate counts of messages that have suspicious attachments or other virus indicators, and update database 112 with the counts and generate virus outbreak information for later retrieval and use by virus information logic 114 of messaging gateway 107.

Additionally or alternatively, virus information source 104 may comprise the SpamCop information service that is accessible at domain "spamcop.net" on the World Wide Web, or users of the SpamCop service. Virus information source 104 may comprise one or more Internet service providers or other high-volume mail receivers.

In another alternative embodiment, as a supplement to the automatic approaches herein, virus information source 104 may comprise the manual review of data that is obtained by information services consultants or analysts, or external sources. For example, a human administrator monitoring alerts from anti-virus vendors, third-party vendors, security mailing lists, spamtrap data and other sources can detect viruses well in advance of when virus definitions are published in most cases.

Threat information processor 108 can include or be communicatively coupled to a threat operation center (TOC), a receiving virus score (RVS) processor, or both. The TOC and RVS processor can be separate from threat information processor 108 but communicatively coupled to database 112 and public network 102. The TOC can be implemented as a staffed center with personnel available 24 hours a day, 7 days a week to monitor the information collected by threat information processor 108 and stored in database 112. The personnel staffing the TOC can take manual actions, such as issuing virus outbreak alerts, updating the information stored in database 112, publishing virus outbreak information so that MGAs can access the virus outbreak information, and manually initiating the sending of virus outbreak information to messaging gateway 107 and other MGAs.

In an embodiment, threat information processor 108 includes sender analysis logic 130, which comprises one or more computer programs or other software elements that implement the functions described herein. In general, sender analysis logic 130 operates on message information stored in database 112, and determines apparent senders of messages that are recorded in the database, when the sender information actually received in the messages is non-trusted.

In an embodiment, threat information processor 108 includes, or receives information from, one or more trusted blacklists that compile copies or attributes of messages that are known to comprise spam or known to bear threats. Threat information processor 108 may host the blacklists, query external blacklists, or obtain blacklist information through a messaging protocol.

In certain embodiments, database 112 is termed a corpus, and comprises a database of the threat information processor 108 that contains messages that have been definitively classified as spam or not, containing viruses or not, or otherwise classified with respect to other specific threats. Thus, the corpus represents a trusted repository of historical message information that can be used to determine rules or other criteria that indicate whether future messages are spam or contain threats.

Messages enter the corpus from automated sources such as spamtraps 106 and from human classification systems. The corpus also may use avatars 140 to go into the public network and obtain messages for classification.

The original sending network address of a message in the corpus is not necessarily known at the time that a message enters the corpus. In this context, "original sending IP address" is the address of a message sender that normally would be subject to reputation scoring on a customer MGA, and is the last address before the message left the Internet. For training purposes and to determine weight factors, a process of determining the last connecting IP address is needed. Received headers of a message could be examined to determine source IP addresses, or the numbering scheme of IP addresses could be examined to attempt to identify private networks. However, these approaches are not useful when a message is forwarded multiple times, which is a technique often used by spammers.

Figure 2:
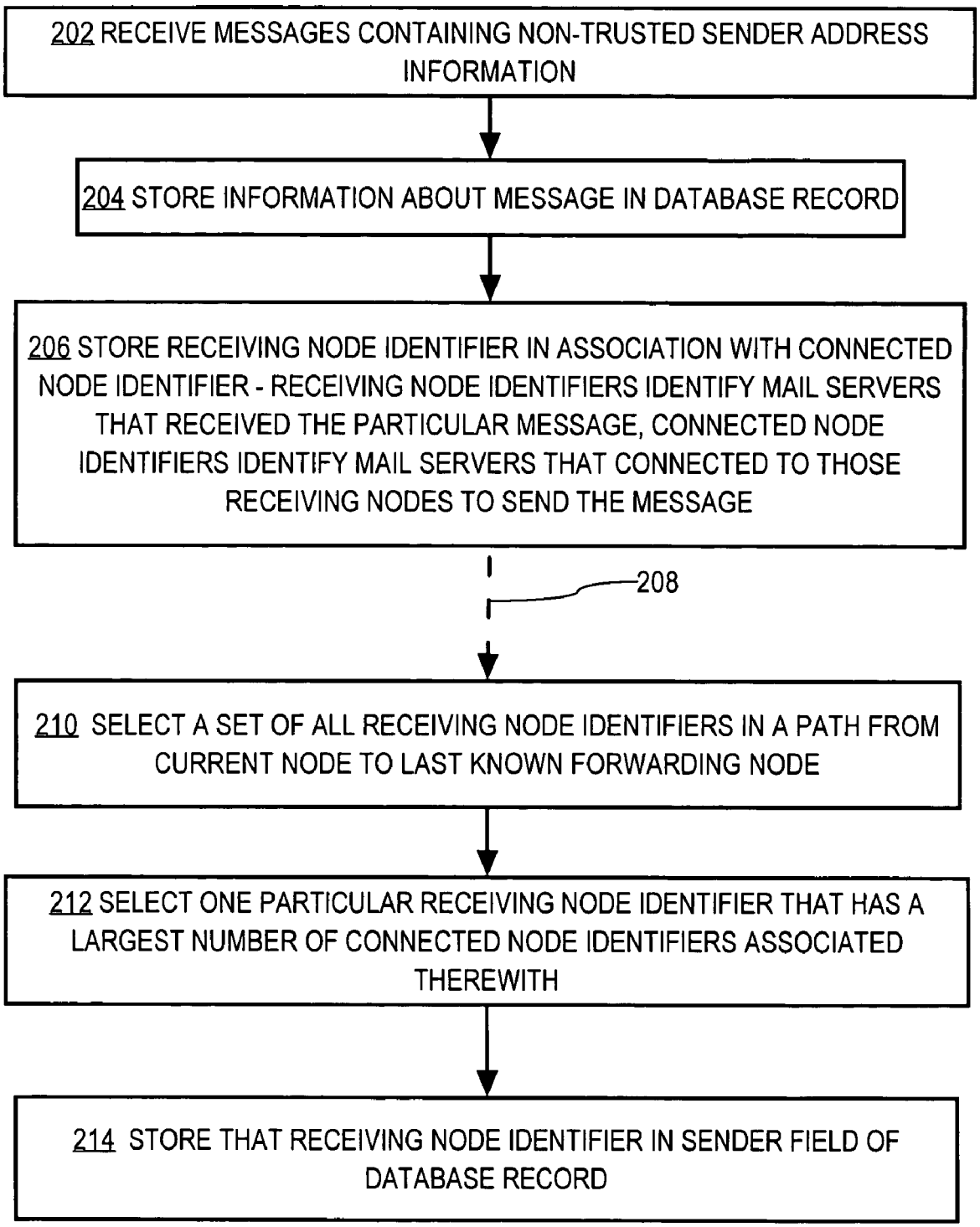
FIG. 2 is a flow diagram that illustrates a high level overview of one embodiment of a method for determining network addresses of senders of electronic mail messages.

FIG. 2 is a flow diagram that illustrates a high level overview of one embodiment of a method for determining network addresses of senders of electronic mail messages.

In step 202, one or more messages containing non-trusted sender address information are received. For example, messaging gateway 107 receives messages from virus sender 100, virus information source 104, or spamtrap 106, and the messaging gateway forwards copies of the messages or metadata about the messages to the threat information processor 108.

In step 204, for a particular message, information about the messages is stored in a database record. For example, sender analysis logic 130 of threat information processor 108 creates and stores a record for each message in database 112. The record may comprise a copy of the message stored in association with metadata that describes the message and threat characteristics associated with the message. In one embodiment, the record includes a sender field for use in storing an identification of an apparent sender of the message. In one embodiment, the record has the structure shown in FIG. 3, which is described further herein.

Step 206 comprises storing a receiving node identifier for the message in association with a connected node identifier. Receiving node identifiers identify mail servers that received the particular message. Connected node identifiers identify mail servers that connected to the receiving nodes to send the message through one or more networks. In an embodiment, receiving node identifiers and connected node identifiers comprise network addresses such as IP addresses. In an embodiment, receiving node identifiers and connected node identifiers are stored in pairs.

Figure 3:
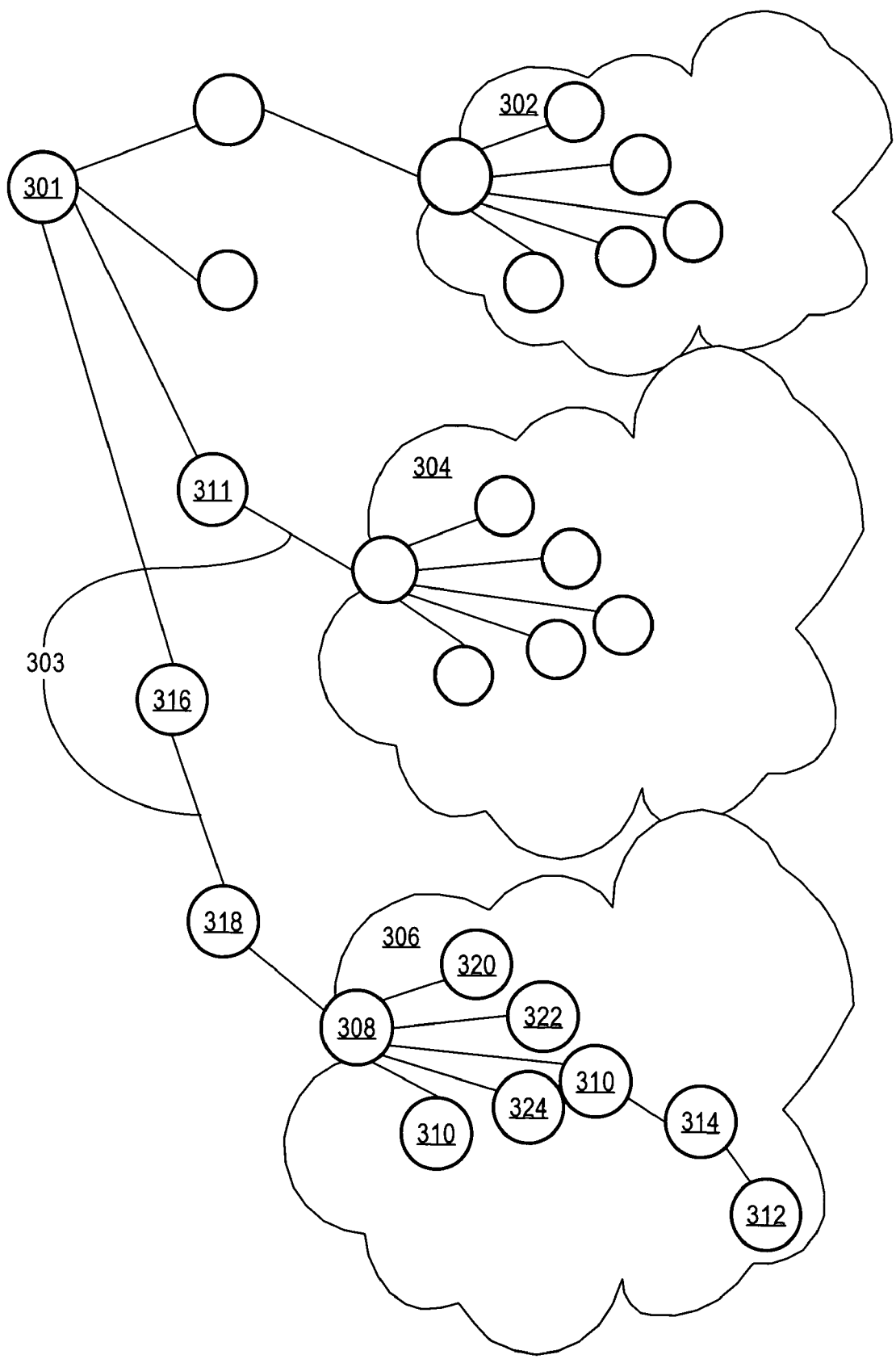
FIG. 3 is a block diagram that illustrates a tree representation of nodes in a network.

The use of receiving node identifiers and connected node identifiers may be understood more fully with reference to FIG. 3. FIG. 3 is a block diagram that illustrates a tree representation of nodes in a network. The tree represents all paths taken by messages to reach the database 112. Nodes in the tree represent network elements such as MGAs or mail servers, and branches in the tree represent links among such nodes.

In FIG. 3, node 301 represents a messaging gateway 107 that received a particular message. Nodes 311, 316 are closest mail servers that connected to the messaging gateway 107 to deliver the particular message. Nodes 311, 316 may connect directly or indirectly by links 303 to other nodes 308 at the edge of domains 302, 304, 306 of public network 102.

Node 312 represents a mail server of a spam sender or virus sender 100. In the example of FIG. 3, virus sender 100 sends a message from node 312 and repeatedly forwards the message through nodes 314 and 310 to reach node 308, which connects indirectly to node 301 of messaging gateway 107. Thus, the virus sender 100 owns, operates or controls nodes 310, 312, 314. Node 310 is the last controlled node and may be deemed the actual sender of a particular message.

Analysis of tree representations of this form has discovered that certain nodes 308 have a large number of connections within domain 306 of the public network 102, whereas nodes 311, 316 have few connections. The nodes 308 tend to have a large "fan-out" and indicate a point at which a message left the Internet and entered an enterprise network that messaging gateway 107 at node 301 is protecting. This analysis has discovered that a sending node 310 is likely to be a node that has connected to the certain nodes 308 with many connections. Thus, this analysis has discovered that the actual sender of a particular message (e.g., node 310) is highly likely to be connected to one of the nodes 308 that has a large number of connections. In this description, node 310 may be labeled a "connected node" and node 308 may be labeled a "receiving node."

Therefore, in the present approach, a tree representation is constructed, nodes 308 with a large number of connections are identified, and the sending network address of a particular message is determined to be the address of one of the nodes 310 that is connected to one of the nodes 308.

Further, in an embodiment, a tree data structure is not used to store the representation of FIG. 3, because such a structure would require too much memory. Instead, in an embodiment, the database 112 stores pairs of values, in which a first value in a pair indicates a receiving node identifier or address and a second value indicates a connected node identifier or address. Identifying clusters of repeated addresses in a list indicates that an associated node has a high degree of fan-out in terms of upstream network nodes.

For example, assume that database 112 stores information indicating receiving five (5) copies of a particular message from nodes with addresses in the hypothetical range 301 to 330, identifying nodes of FIG. 3. In a practical embodiment, such addresses could be IP addresses. Assume further that database 112 holds a record for the particular message that includes the following address pairs: (308, 320); (308, 322); (308, 310); (308, 324); (316, 318); (318, 308). These values in the database indicate that the messaging gateway at node 301, and other messaging gateways that provide information to the same threat information processor 108, received copies of a particular message from receiving nodes 308, 316, and 318. Receiving node 308 forwarded copies of the message that it had received from nodes 320, 322, 310. Receiving node 316 forwarded the message after receiving it from node 318. Receiving node 318 forwarded the message after receiving it from node 308.

Referring again to FIG. 2, in step 210, a set of all receiving node identifiers in a path from the current node to the last known forwarding node is selected. With reference to the example, step 210 would involve selecting {(308, 320); (308, 322); (308, 310); (308, 324); (316, 318); (318, 308)}.

In step 212, one particular receiving node identifier is selected having a largest number of connected node identifiers associated therewith. In the example, the cluster of pairs with a first value of "308" indicates that node 308 and has four upstream nodes connecting to it (nodes 320, 322, 324, 310). The database 112 also includes address values indicating other messaging gateways receiving the same message. However, node 308 has the highest degree of fan-out, and a spam message or virus-bearing message arriving through node 308 probably originates at one of nodes 320, 322, 324, 310, rather than at some further upstream node. Therefore, node 308 of the set {(308, 320); (308, 322); (308, 310); (308, 324); } is selected, and nodes (316, 318); (318, 308) are not selected.

Referring again to FIG. 3, node 312 may actually represent the IP address of origin for a particular spam message. However, spammers often insert false or spoofed headers or prepend additional headers that specify the addresses of one or more later nodes 314. The addresses of these nodes cannot be determined with accuracy. Therefore, the node 310 that connected to a fan-out node 308 has been found as the best indicator of a sending IP address. Addresses associated with other nodes are less trustable.

The approach herein operates best when a large sample of messages is received so that the fan-out points are visible in the tree representation.

In step 214, the selected receiving node identifier is stored in the sender field of the database record, indicating an apparent sender of the message. Thus, address 308 is used as the trusted address of the message. While node 308 is not the actual sender (as described above, node 310 is the actual sender), using node 308 as the apparent sender enables great accuracy in detecting spam and threat-bearing messages by ascribing a reputation to node 308. Further, the foregoing approach provides a method of determining a branching point of a tree representation without actually constructing a tree in computer memory.

In an embodiment, the address of node 308 is used in the corpus for training purposes. For example, in determining sender reputation, two rules might express the logic "IP is in blacklist Foo" and "IP is not in blacklist Foo." If the first rule is true for a particular message's sender IP address, then a probability of 0.98 might be applied, where a probability of 0 indicates a message is not spam, and if the second rule is true then a probability of 0.40 might be applied. Note that if the second rule is true, such that the sender's IP address is not in the referenced blacklist, a very low probability (e.g. 0.02) is not applied. The rationale is that the absence of an IP address from a particular blacklist does not guarantee that the message is not spam, at least not without further training.

The values of 0.98 and 0.40 are given as examples. To determine actual values, training over a large set of messages is needed. To perform such training, in one embodiment, a large number of network addresses for messages is compared to a particular blacklist (e.g., "Foo") and a determination is made of what percentage of the addresses were in the blacklist and what percentage were not. The percentage values are then refined by reviewing each of the messages and actually determining which is spam. Accordingly, the corpus performs best as a training aid if the actual sender IP address is known.

In an embodiment, database 112 may store the following attribute values for messages:

| Attribute | Source | Notes |
| --- | --- | --- |
| source | header | |
| date | header | |
| sender | header | |
| from | header | |
| recipient/to | header | |
| cc | header | |
| reply-to | header | |
| subject | header | |
| content type | header | |
| message id | header | Value of the Message-ID header |
| mail agent | header | |
| attachments | header/body | |
| sbrs score | queried | The SBRS score for the connecting ip address is queried during message insertion using the connecting ip address. |
| sbrs score timestamp | computed | Set at the time SBRS is queried for the score. |
| sbrs ruleset | computed | Which SBRS rules (reverse-generated from the bitmask) contributed to the reputation score. |
| connecting ip | computed | Taken from the X-Spam-Untrusted-Relays header. This header is computed by looking backwards at the "hops" until we cross a network boundary. If that doesn't work, use the first "untrusted" ip address in the received headers. |

-continued

| Attribute | Source | Notes |
|---|---|---|
| checksum | computed | Used for uniqueness determination. Computed from first N bytes of message body using SHA1, where N = min(1024, message body length/2). |
| connecting ip country | queried | Taken from the X-Spam-RBL header. This header is taken directly from a TXT record query. |
| suspected category | computed | Computed using the X-Spam-Status and X-ClamAV-Status headers. If ClamAV reports the message as a virus, then it is "virus". If the SpamAssassin score is less than the configured suspected ham threshold for the given source, then the message is "ham" (a message not known to be spam, but not necessarily fully trusted). If the SpamAssassin score is greater than the configured suspected spam threshold for the given source, then it is "spam". If no specific thresholds exist for a given source, the default thresholds are used. Otherwise, it is "unknown". |
| category | set/ computed | If message is manually submitted with a category, that category is used. Otherwise, it is computed using the same algorithm as suspected category, but with the configurable thresholds for "ham" and "spam" rather than "suspected ham" and "suspected spam". |
| blowback | set | This attribute must be manually set by a corpus administrator. It defaults to False. |
| bounce | set | This attribute must be manually set by a corpus administrator. It defaults to False. |
| phishing | set/ computed | If the X-ClamAV-Status header determines the message to be a phishing attack, then it is True. Otherwise, the value may be set manually by a corpus administrator, It defaults to False. |
| virus rescan | computed | Set to True if the virus status of a message is unknown. Set to False otherwise. |
| virus score | computed | Computed using ClamAV. |
| virus score timestamp | computed | Set each time a message is (re-)scanned using ClamAV. |
| virus ruleset | computed | Which viruses were found. |
| spam rescan | computed | Set to True if either the spam status of a message is unknown or if any of the X-Spam headers necessary for other critical attributes are not present during the last scan. |
| spam score | computed | Computed using stock SpamAssassin. |
| spam score timestamp | computed | Set each time a message is (re-)scanned using ClamAV. |
| spam ruleset | computed | Which spam rules contributed to the "spaminess" score. |
| languages | computed | Computed using SpamAssassin language-detection functionality. |
| audits | computed | Set each time any message attribute is changed. Tracks what was changed, when it changed and who was responsible. |

4.0 Implementation Mechanisms—Hardware Overview

Figure 4:
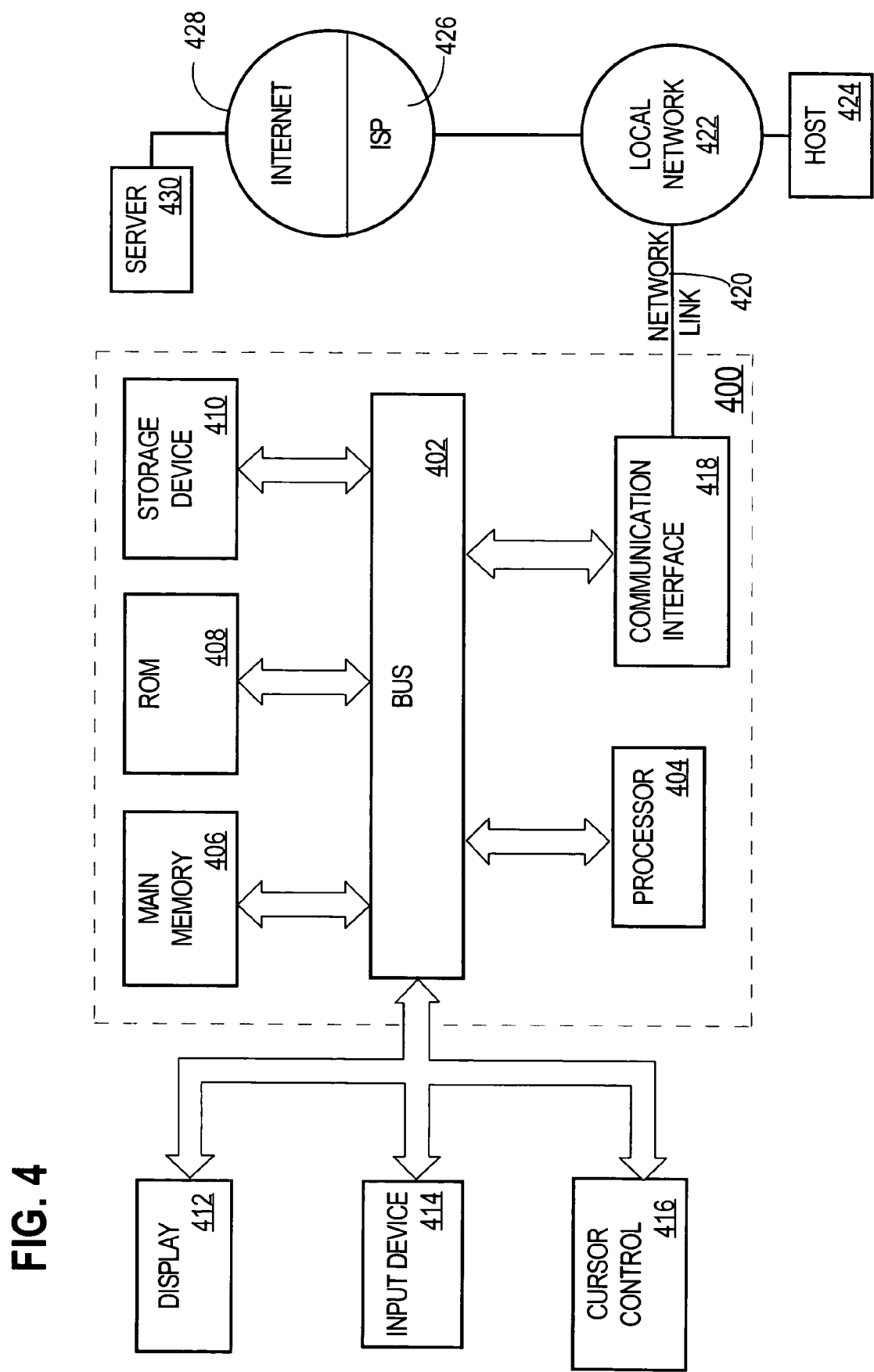
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for determining network addresses of senders of electronic mail messages. According to one embodiment of the invention, determining network addresses of senders of electronic mail messages is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any storage medium that participates in providing instructions to processor 404 for execution. Such a medium may take many forms, including but not limited to, non-volatile media, and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for determining network addresses of senders of electronic mail messages as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:
    receiving a plurality of electronic mail messages containing sender address information that is non-trusted;
    for each particular one of the electronic mail messages:
        storing information about the particular message in a database record;
        creating and storing one or more receiving node identifiers in association with respective connected node identifiers,
            wherein the receiving node identifier identifies a receiving mail server that received the particular message and the connected node identifier identifies a connected mail server that directly connected to the receiving mail server to send the particular message directly to the receiving mail server;
        based on the associations between the receiving node identifiers and the respective connected node identifiers, selecting one particular receiving node identifier that has a largest number of directly connected node identifiers associated therewith;
        selecting one particular connected node identifier that is associated with the one particular receiving node identifier that has the largest number of the associated connected node identifiers;
        storing, in the database record, in a sender field that identifies a sender of the particular message, the one particular connected node identifier.

2. The method of claim 1, wherein the receiving node identifiers and connected node identifiers are IP addresses.

3. The method of claim 1, wherein the receiving node identifiers and connected node identifiers are stored in a logical tree data structure that represents a network topology that includes the receiving nodes and the connected nodes.

4. The method of claim 3, wherein nodes in the tree represent network elements involved in sending, receiving or forwarding the electronic mail messages and branches in the tree represent mail transfer protocol connections that were established between the network elements.

5. The method of claim 1, further comprising:
retrieving the database record;
determining whether a value of the sender field is found in a blacklist;
creating and storing a poor reputation score value when the value of the sender field is found in the blacklist and creating and storing another reputation score value indicating a reputation other than a good reputation when the value of the sender field is not found in the blacklist.

6. A computer-readable tangible storage medium storing one or more sequences of instructions which, when executed by one or more processors, cause the one or more processors to perform:
receiving a plurality of electronic mail messages containing sender address information that is non-trusted;
for each particular one of the electronic mail messages:
storing information about the particular message in a database record;
creating and storing one or more receiving node identifiers in association with respective connected node identifiers,
wherein the receiving node identifier identifies a receiving mail server that received the particular message and the connected node identifier identifies a connected mail server that directly connected to the receiving mail server to send the particular message directly to the receiving mail server;
based on the associations between the receiving node identifiers and the respective connected node identifiers, selecting one particular receiving node identifier that has a largest number of directly connected node identifiers associated therewith;
selecting one particular connected node identifier that is associated with the one particular receiving node identifier that has the largest number of the associated connected node identifiers;
storing, in the database record, in a sender field that identifies a sender of the particular message, the one particular connected node identifier.

7. The computer-readable storage medium of claim 6, wherein the receiving node identifiers and connected node identifiers are IP addresses.

8. The computer-readable storage medium of claim 6, wherein the receiving node identifiers and connected node identifiers are stored in a logical tree data structure that represents a network topology that includes the receiving nodes and the connected nodes.

9. The computer-readable storage medium of claim 8, wherein nodes in the tree represent network elements involved in sending, receiving or forwarding the electronic mail messages and branches in the tree represent mail transfer protocol connections that were established between the network elements.

10. The computer-readable storage medium of claim 6, further comprising:
retrieving the database record;
determining whether a value of the sender field is found in a blacklist;
creating and storing a poor reputation score value when the value of the sender field is found in the blacklist and creating and storing another reputation score value indicating a reputation other than a good reputation when the value of the sender field is not found in the blacklist.

11. An apparatus, comprising:
means for receiving a plurality of electronic mail messages containing sender address information that is non-trusted;
means for storing information about each particular one of the electronic mail messages in a database record;
means for creating and storing one or more receiving node identifiers in association with respective connected node identifiers,
wherein the receiving node identifier identifies a receiving mail server that received the particular message and the connected node identifier identifies a connected mail server that directly connected to the receiving mail server to send the particular message directly to the receiving mail server;
means for selecting one particular receiving node identifier that has a largest number of directly connected node identifiers associated therewith, based on the associations between the receiving node identifiers and the respective connected node identifiers;
means for selecting one particular connected node identifier that is associated with the one particular receiving node identifier that has the largest number of the associated connected node identifiers;
means for storing, in the database record, in a sender field that identifies a sender of the particular message, the one particular connected node identifier.

12. The apparatus of claim 11, wherein the receiving node identifiers and connected node identifiers are IP addresses.

13. The apparatus of claim 11, wherein the receiving node identifiers and connected node identifiers are stored in a logical tree data structure that represents a network topology that includes the receiving nodes and the connected nodes.

14. The apparatus of claim 13, wherein nodes in the tree represent network elements involved in sending, receiving or forwarding the electronic mail messages and branches in the tree represent mail transfer protocol connections that were established between the network elements.

15. The apparatus of claim 11, further comprising:
means for retrieving the database record;
means for determining whether a value of the sender field is found in a blacklist;
means for creating and storing a poor reputation score value when the value of the sender field is found in the blacklist and creating and storing another reputation score value indicating a reputation other than a good reputation when the value of the sender field is not found in the blacklist.

16. An apparatus, comprising:
one or more processors coupled to a network interface;
a computer-readable tangible storage medium coupled to the one or more processors and carrying one or more sequences of instructions which, when executed by the processors, cause the one or more processors to perform:
receiving a plurality of electronic mail messages containing sender address information that is non-trusted;
for each particular one of the electronic mail messages:
storing information about the particular message in a database record;
creating and storing one or more receiving node identifiers in association with respective connected node identifiers,
wherein the receiving node identifier identifies a receiving mail server that received the particular message and the connected node identifier identifies a connected mail server that directly connected to the receiving mail server to send the particular message directly to the receiving mail server;

based on the associations between the receiving node identifiers and the respective connected node identifiers, selecting one particular receiving node identifier that has a largest number of directly connected node identifiers associated therewith;

selecting one particular connected node identifier that is associated with the one particular receiving node identifier that has the largest number of the associated connected node identifiers;

storing, in the database record, in a sender field that identifies a sender of the particular message, the one particular connected node identifier.

17. The apparatus of claim 16, wherein the receiving node identifiers and connected node identifiers are IP addresses.

18. The apparatus of claim 16, wherein the receiving node identifiers and connected node identifiers are stored in a logical tree data structure that represents a network topology that includes the receiving nodes and the connected nodes.

19. The apparatus of claim 18, wherein nodes in the tree represent network elements involved in sending, receiving or forwarding the electronic mail messages and branches in the tree represent mail transfer protocol connections that were established between the network elements.

20. The apparatus of claim 16, further comprising sequences of instructions which, when executed by the processors, cause the one or more processors to perform:

retrieving the database record;

determining whether a value of the sender field is found in a blacklist;

creating and storing a poor reputation score value when the value of the sender field is found in the blacklist and creating and storing another reputation score value indicating a reputation other than a good reputation when the value of the sender field is not found in the blacklist.

* * * * *